(12) United States Patent
Castelain et al.

(10) Patent No.: US 9,363,129 B2
(45) Date of Patent: Jun. 7, 2016

(54) METHOD AND A DEVICE FOR DECODING DIFFERENTIALLY MODULATED SYMBOLS

(71) Applicant: MITSUBISHI ELECTRIC CORPORATION, Chiyoda-ku (JP)

(72) Inventors: Damien Castelain, Rennes (FR); Cristina Ciochina, Rennes (FR)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/381,853

(22) PCT Filed: Feb. 25, 2013

(86) PCT No.: PCT/EP2013/053732
§ 371 (c)(1),
(2) Date: Aug. 28, 2014

(87) PCT Pub. No.: WO2013/127746
PCT Pub. Date: Sep. 6, 2013

(65) Prior Publication Data
US 2015/0049845 A1 Feb. 19, 2015

(30) Foreign Application Priority Data

Feb. 29, 2012 (EP) .................................. 12157555

(51) Int. Cl.
*H04L 27/06* (2006.01)
*H04L 27/26* (2006.01)
*H04L 27/20* (2006.01)

(52) U.S. Cl.
CPC ........ *H04L 27/2649* (2013.01); *H04L 27/2071* (2013.01); *H04L 27/2656* (2013.01); *H04L 27/2662* (2013.01)

(58) Field of Classification Search
None
See application file for complete search history.

(56) References Cited

U.S. PATENT DOCUMENTS

| | | | | |
|---|---|---|---|---|
| 4,715,048 A | * | 12/1987 | Masamura | H04B 7/084 375/347 |
| 7,076,168 B1 | * | 7/2006 | Shattil | H04B 10/25752 398/202 |
| 2007/0217552 A1 | * | 9/2007 | Lee | H04L 27/2656 375/343 |

OTHER PUBLICATIONS

Written Opinion of the International Searching Authority Issued May 27, 2013 in PCT/EP13/053732 Filed Feb. 25, 3013.
International Search Report Issued May 27, 2013 in PCT/EP13/053732 Filed Feb. 25, 3013.

* cited by examiner

Primary Examiner — Chieh M Fan
Assistant Examiner — Wednel Cadeau
(74) Attorney, Agent, or Firm — Oblon, McClelland, Maier & Neustadt, L.L.P.

(57) ABSTRACT

A method for decoding differentially modulated received symbols, the differentially modulated received symbols corresponding to a transmission of a differentially modulated version of a codeword out of a set of possible codewords, the received symbols being transferred onto resources of a channel, the resources being equally spaced. A receiver, for each possible codeword: obtains a vector of differentially demodulated symbols by differentially demodulating the differentially modulated received symbols obtained by combining two consecutive differentially modulated received symbols; calculates the product of each differentially demodulated symbol by the conjugate of the element of the codeword having the same rank within the codeword as the differentially demodulated received symbol; calculates the sum of the products; decodes the vector of differentially demodulated symbols by selecting the codeword for which the sum of the products is the maximum.

5 Claims, 8 Drawing Sheets

Fig. 1

| Active Carriers in P1<br>$k_0..k_{383}$ |
|---|
| 44 45 47 51 54 59 62 64 65 66 70 75 78 80 81 82 84 85 87 88 89 90 94 96 97 98 102 107 110 112 113 114 116 117 119 120 121 122 124 125 127 131 132 133 135 136 137 138 142 144 145 146 148 149 151 152 153 154 158 160 161 162 166 171 |
| 172 173 175 179 182 187 190 192 193 194 198 203 206 208 209 210 212 213 215 216 217 218 222 224 225 226 230 235 238 240 241 242 244 245 247 248 249 250 252 253 255 259 260 261 263 264 265 266 270 272 273 274 276 277 279 280 281 282 286 288 289 290 294 299 300 301 303 307 310 315 318 320 321 322 326 331 334 336 337 338 340 341 343 344 345 346 350 352 353 354 358 363 364 365 367 371 374 379 382 384 385 386 390 395 396 397 399 403 406 411 412 413 415 419 420 421 423 424 425 426 428 429 431 435 438 443 446 448 449 450 454 459 462 464 465 466 468 469 471 472 473 474 478 480 481 482 486 491 494 496 497 498 500 501 503 504 505 506 508 509 511 515 516 517 519 520 521 522 526 528 529 530 532 533 535 536 537 538 542 544 545 546 550 555 558 560 561 562 564 565 567 568 569 570 572 573 575 579 580 581 583 584 585 586 588 589 591 595 598 603 604 605 607 611 612 613 615 616 617 618 622 624 625 626 628 629 631 632 633 634 636 637 639 643 644 645 647 648 649 650 654 656 657 658 660 661 663 664 665 666 670 672 673 674 678 683 |
| 684 689 692 696 698 699 701 702 703 704 706 707 708 712 714 715 717 718 719 720 722 723 725 726 727 729 733 734 735 736 738 739 740 744 746 747 748 753 756 760 762 763 765 766 767 768 770 771 772 776 778 779 780 785 |

| 5 | 11 | 27 | 63 | 69 | 75 | 91 | 127 | 133 | 139 | 155 | 161 |
| 167 | 173 | 189 | 195 | 211 | 247 | 273 | 319 | 321 | 357 | 373 | 379 |

METHOD AND A DEVICE FOR DECODING DIFFERENTIALLY MODULATED SYMBOLS

The present invention relates generally to a method and a device for decoding differentially modulated symbols.

The present invention is related to telecommunication systems employing differential modulation techniques and wherein a phase error affects the differentially modulated symbols.

The present invention aims at providing a method and a device which enable the decoding of differentially modulated symbols which may be mapped onto unequally distributed subcarriers of an OFDM system whose receiver is affected by a timing offset error or which may be transmitted via sequential Time Division Multiplexing transmission where the data symbols are not necessarily consecutive and where the receiver is affected by a frequency synchronization error generating a phase ramp offset.

To that end, the present invention concerns a method for decoding differentially modulated received symbols, the differentially modulated received symbols corresponding to a transmission of a differentially modulated version of a codeword out of a set of possible codewords, each codeword being a vector composed of a predetermined number of elements, the received symbols being transferred onto resources of a channel between a transmitter and a receiver, the resources being equally spaced, characterized in that the method comprises the steps executed by the receiver for each possible codeword of:

obtaining a vector of differentially demodulated symbols by differentially demodulating the differentially modulated received symbols, each differentially demodulated symbol being obtained by combining two consecutive differentially modulated received symbols, calculating the product of each differentially demodulated symbol obtained by combining two consecutive modulated received symbols transferred onto resources equally spaced by the conjugate of the element of the codeword having the same rank within the codeword as the differentially demodulated received symbol within the vector of differentially demodulated symbols, calculating the module of the sum of the products, decoding the vector of differentially demodulated symbols by selecting the codeword for which the module of the sum of the products is the maximum among the calculated modules of sums of the products.

The present invention also concerns a device for decoding differentially modulated received symbols, the differentially modulated received symbols corresponding to a transmission of a differentially modulated version of a codeword out of a set of possible codewords, each codeword being a vector composed of a predetermined number of elements, the received symbols being transferred onto resources of a channel between a transmitter and a receiver, the resources being equally spaced, characterized in that the device for decoding is included in the receiver and comprises, for each possible codeword:

means for obtaining a vector of differentially demodulated symbols by differentially demodulating the differentially modulated received symbols, each differentially demodulated symbol being obtained by combining two consecutive differentially modulated received symbols, means for calculating the product of each differentially demodulated symbol obtained by combining two consecutive modulated received symbols transferred onto resources equally spaced by the conjugate of the element of the codeword having the same rank within the codeword as the differentially demodulated received symbol within the vector of differentially demodulated symbols, means for calculating the module of the sum of the products, means for decoding the vector of differentially demodulated symbols by selecting the codeword for which the module of the sum of the products is the maximum among the calculated modules of sums of the products.

Thus, the decoding performance of differentially modulated symbols affected by a phase error similar to a phase ramp is improved.

According to a particular feature, if received symbols are transferred onto resources that may be not equally spaced, the receiver:

groups the differentially demodulated symbols into groups of differentially demodulated symbols, each group of differentially demodulated symbols comprising symbols obtained by combining two consecutive differentially modulated received symbols transferred onto resources spaced by a predetermined number of resources, for each possible codeword, the calculating of the products and modules of the sums is executed for each group of differentially demodulated symbols obtained, for each possible codeword, the receiver sums modules of the sums calculated for all the groups of differentially demodulated symbols, and the decoding of the differentially demodulated symbol is performed by selecting the codeword for which the sum of the modules of the sums of products is the maximum among the sums of the modules of sums of products.

Thus, the decoding of differentially modulated symbols which are mapped onto unequally distributed subcarriers of an OFDM system whose receiver is affected by a timing offset error or which may be transmitted via sequential Time Division Multiplexing transmission where the data symbols are not consecutive and whose receiver is affected by a frequency synchronization error is improved.

According to a particular feature, the received symbols are the frequency elements of Orthogonal Frequency Division Multiplexing symbols and the differentially modulated symbols are transferred onto sub-carriers.

According to a particular feature, the received symbols are time division multiplexing symbols and the differentially modulated symbols are transferred onto time slots.

According to a particular feature, the receiver:

obtains information related to a phase error ramp that may occur or occurs on the differentially modulated received symbols during synchronization, checks if information related to the phase error is upper than a predetermined value, interrupts the products and modules of the sums calculations if information related to the phase error is not upper than the predetermined value.

Thus, the algorithm is executed only when it brings important performance improvement, and the number of computations at the receiver is limited.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and apparatus according to the invention, they will not be repeated here.

The characteristics of the invention will emerge more clearly from a reading of the following description of an example of embodiment, the said description being produced with reference to the accompanying drawings, among which.

Figure 1:
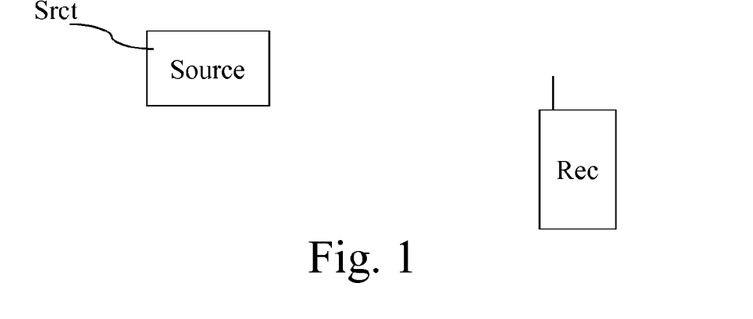
FIG. 1 represents a telecommunication network in which the present invention is implemented.

The telecommunication network is for example a telecommunication network in which at least one source Srct transfers or broadcasts signals within an area in which at least one receiver Rec is located.

The source Srct is for example a terrestrial station or a satellite which broadcasts signals complying with DVB (Digital Video Broadcast) standards.

The telecommunication network is for example a cellular telecommunication network, in which a base station transfers signals to a mobile terminal or broadcasts signals to at least two mobile terminals. The source Srct may be a mobile terminal which transfers signals to a base station.

The receiver Rec may be a mobile terminal to which data like video signals are broadcasted or a mobile terminal which is in communication with a remote telecommunication device like a mobile phone or with a server or a base station or a home base station which receives signals from the mobile terminal.

Only one source Srct is shown in the FIG. 1 for the sake of simplicity, but the network may comprise a more important number of sources Srct.

Only one receiver Rec is shown in the FIG. 1 for the sake of simplicity, but signals may be transferred or broadcasted to a more important number of receivers Rec.

The signals transferred or broadcasted by the source Srcs may be OFDM symbols, for example compatible with DVB-NGH broadcasting norm.

The present invention will be disclosed in an example wherein signals are OFDM (Orthogonal Frequency Division Multiplexing) symbols. The present invention is also applicable when signals are transferred or broadcasted using Time Division Multiplex scheme as it will be disclosed hereinafter.

In DVB for example, in the standard ETSI EN 302755 v1.2.1 (2010-10), "Digital Video Broadcasting (DVB); Frame structure channel coding and modulation for a second generation DVB system (DVB-T2)" some particular synchronization exists.

A synchronization symbol noted P1 is formed by appending prefix/postfix to an OFDM symbol containing one thousand twenty four subcarriers. Out of the one thousand twenty four subcarriers, eight hundred fifty three subcarriers in the middle of the band are useful subcarriers, the rest being guard subcarriers. Out of the eight hundred fifty three useful subcarriers, only three hundred eighty four are used, they are named active subcarriers, leaving the others named unused subcarriers set to zero.

The source Srct generates the P1 synchronization symbol based on a bit information sequence S containing p=7 bits of information which are error-correcting encoded to form a three hundred eighty four bits sequence.

The bit information sequence S is composed of two fields, S1 and S2 containing three and respectively four bits. The error correcting code is transferred under the form of a complementary sequence set (CSS) which is made by two patterns CSS1 and CSS2. CSS1 patterns encode S1 based on eight orthogonal sets of eight complementary sequences of length eight. The total length of each CSS1 pattern is then sixty four, while the CSS2 patterns encode S2 based on sixteen orthogonal sets of sixteen complementary sequences of length sixteen.

The total length of each CSS2 pattern is then two hundred fifty six. The sequence b corresponding to S=[S1 S2] is built as b=[CSS1 CSS2 CSS1] and has hence a length of three hundred eighty four. This binary sequence b can be transposed into a corresponding +1/−1 codeword d.

b is modulated using, for example, Differential Binary Phase Shift Keying (DBPSK) x=MSS_DIFF and then scrambled to obtain $x_{SCR}$=MSS_SCR composed of three hundred eighty four symbols to be mapped onto the three hundred eighty four active subcarriers. In the particular case described in DVB-T2, all the codewords d start with the same value, one. There is no need of dummy insertion at the beginning of the differentially coded sequence x. Thus, x and d have the same size. In the general case, the differentially coded sequence x may have a length superior by one with respect to the length of the codeword d and thus a codeword of length M−1 will be mapped after differential modulation onto M active subcarriers. In the following, we will consider that d has only M−1 useful elements and that we can drop the initial value one from the computations.

Figure 2:
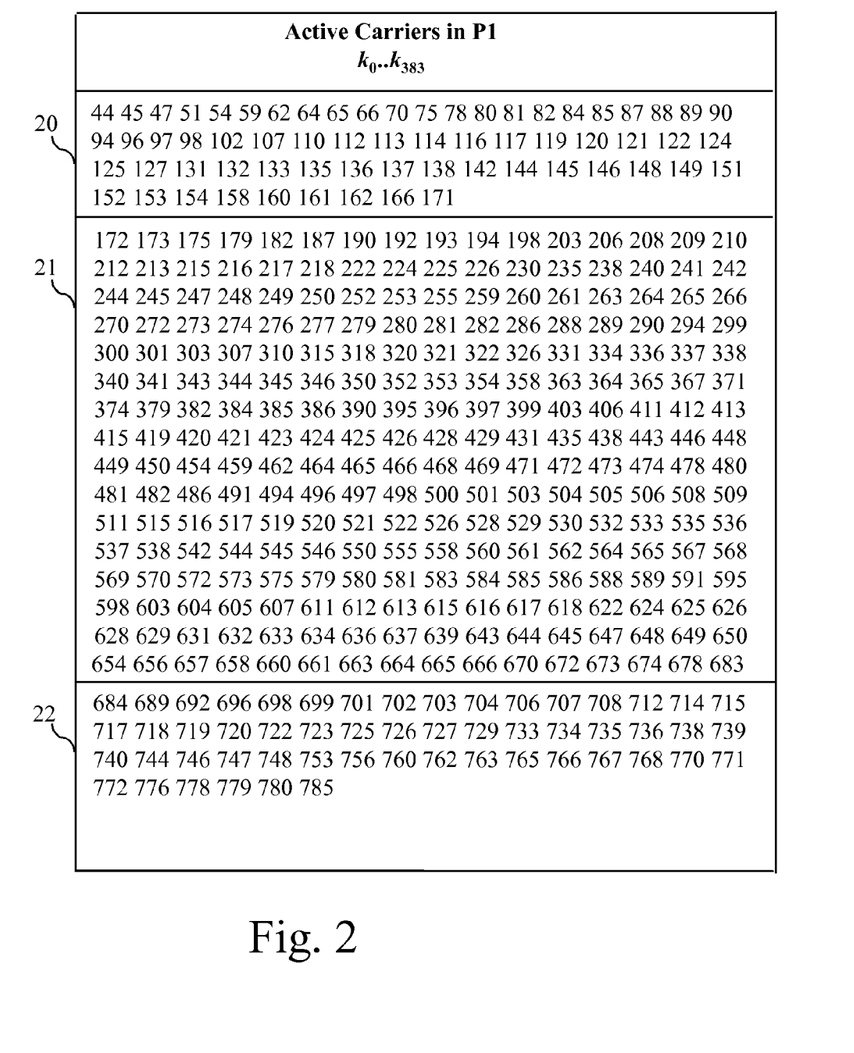
FIG. 2 discloses an example of a set of indexes of the active subcarriers on which a symbol P1 transferred by a source is mapped on three hundred eighty four active subcarriers.

The subcarrier mapping pattern is given by a length M=384 irregular Carrier Distribution Sequence (CDS) as given in FIG. 2.

Other kinds of differential modulations may be used in the present invention.

According to the invention, the receiver Rec:

obtains a vector of differentially demodulated symbols by differentially demodulating the differentially modulated received symbols, each differentially demodulated symbol being obtained by combining two consecutive differentially modulated received symbols, calculates the product of each differentially demodulated symbol obtained by combining two consecutive modulated received symbols transferred onto resources equally spaced by the conjugate of the element of the codeword having the same rank within the codeword as the differentially demodulated received symbol within the vector of differentially demodulated symbols, calculates the module of the sum of the products, decodes the vector of differentially demodulated symbols by selecting the codeword for which the module of the sum of the products is the maximum among the calculated modules of sums of the products.

If received symbols are transferred onto resources that may be not equally spaced, the receiver:

groups the differentially demodulated symbols into groups of differentially demodulated symbols, each group of differentially demodulated symbols comprising symbols obtained by combining two consecutive differentially modulated received symbols transferred onto resources spaced by a predetermined number of resources, for each possible codeword, the calculating of the products and modules of the sums is executed for each group of differentially demodulated symbols obtained, sums modules of the sums calculated for all the groups of differentially demodulated symbols, and the decoding of the differentially demodulated symbol is performed by selecting the codeword for which the sum of the modules of the sums of products is the maximum among the sums of the modules of sums of products.

FIG. 2 discloses an example of a set of indexes of the active subcarriers on which a symbol P1 transferred by a source is mapped on three hundred eighty four active considered subcarriers.

The numbering of the three hundred eighty four indexes shown in FIG. 2 is understood as starting with zero and with respect to the set of eight hundred fifty three useful subcarriers. For example, the first active subcarrier indicated by the first index in the table in FIG. 2 has index 44 within the set of eight hundred fifty three useful subcarriers of the P1 symbol, and is thus the $45^{th}$ useful subcarrier since subcarrier numbering started with index 0.

Row 20 gives the indexes of the first sixty four active subcarriers.

Row 21 gives the indexes of the next two hundred fifty six active subcarriers.

Row 22 gives the indexes of the last sixty four active subcarriers.

Figure 14:
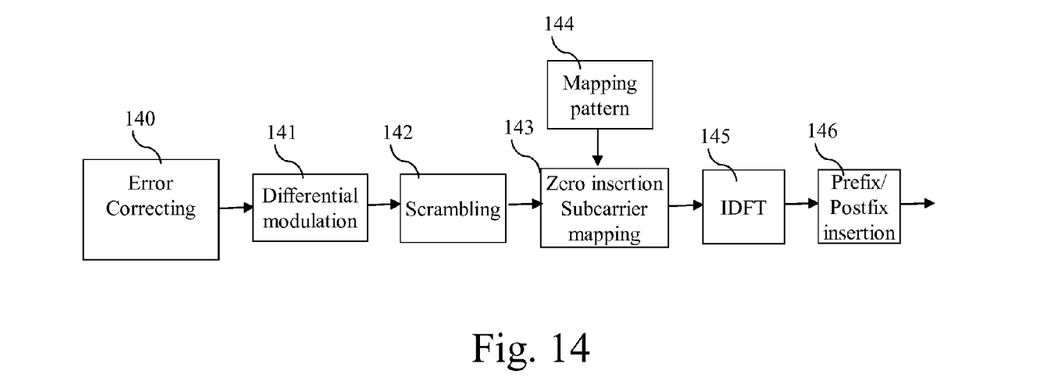
FIG. 14 discloses a block diagram of components of a wireless interface of the source.

The set of index in FIG. 2 identifies the M=384 active carriers out of a set of eight hundred eighty four useful carriers in the middle of a nominal bandwidth. Zero padding is performed up to one thousand twenty four subcarriers prior to N=1024-point Inverse Discrete Fourier Transform. Both prefix and suffix are appended to the IDFT output as shown in FIG. 14.

The distance $\alpha_i$ between the i-th and the i+1th active subcarriers of index $k_{i-1}$ and $k_i$ within the eight hundred fifty three useful subcarriers is not necessarily constant, as shown in the example of FIG. 2.

Let $\alpha=[\alpha_1 \ldots \alpha_{M-1}]$ be the vector containing the distances between each active subcarrier and the following active subcarrier.

The distance is understood as the difference of corresponding indexes, a distance of one corresponds to consecutive subcarriers, a distance of two corresponds to two active subcarriers separated by one unused subcarrier, a distance of three corresponds to two active subcarriers separated by two unused subcarriers, a distance of four corresponds to two active subcarriers separated by three unused subcarriers and a distance of five corresponds to two active subcarriers separated by four unused subcarriers.

The distance $\alpha_i$ can take Q different values denoted $A_1 \ldots Q$. Each value $A_i$ is taken $q_i$ times $$\left(\sum_{i=1}^{Q} q_i = M - 1\right)$$

and the set of indexes of these q values within vector $\alpha$ is denoted by $I_i$. Here the indexes forming sets $I_i$ are understood being counted from 1 to M−1.

In the example FIG. 2, $\alpha$ is a vector of length M−1=383, having elements $\alpha_i$ that can take Q=5 values from one to five as shown in FIGS. 3 to 8.

Figure 3:
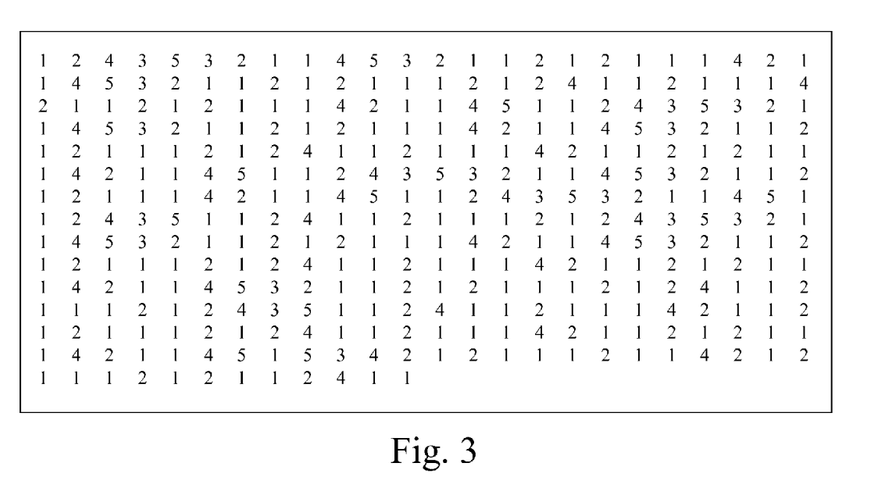
FIG. 3 is a table representing all the distances separating active sub carriers according to the example of FIG. 2.

FIG. 3 is a table representing all the distances separating active sub carriers according to the example of FIG. 2.

More precisely, the table represents the elements of vector $\alpha$ containing the distances between active subcarriers.

Figure 4:
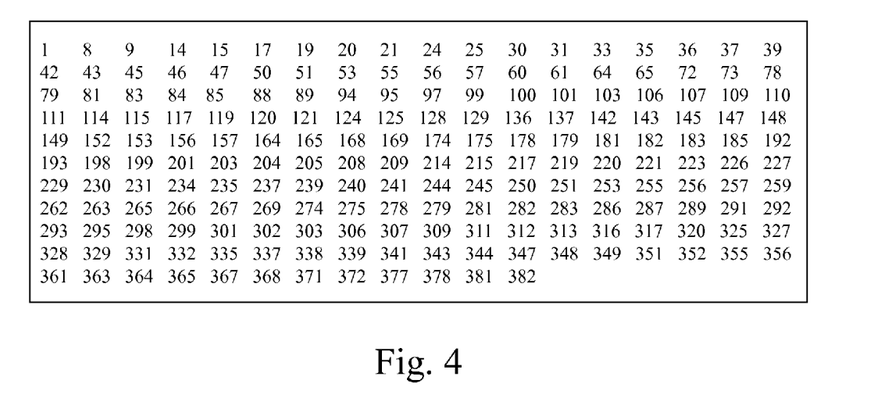
FIG. 4 is a table representing the indexes within the three hundred eighty four active subcarriers of those active subcarriers having a distance of one with next active subcarrier.

FIG. 4 is a table representing the indexes within the three hundred eighty four active subcarriers of those active subcarriers having a distance of one with next active subcarrier.

The numbering of indexes within the three hundred eighty four active subcarriers starts by one.

More precisely, FIG. 4 represents the values of the set $I_1$.

For example, since index 9 is in $I_1$, this means that the distance between the $9^{th}$ and the $10^{th}$ active subcarriers of indexes with respect to the useful subcarriers indexes 65 and 66 given in FIG. 2, is one.

Figure 5:
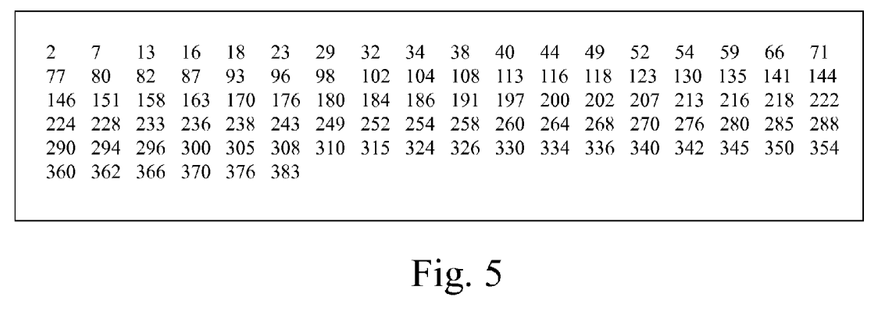
FIG. 5 is a table representing the indexes within the three hundred eighty four active subcarriers of those active subcarriers having a distance of two with next active subcarrier.

FIG. 5 is a table representing the indexes within the three hundred eighty four active subcarriers of those active subcarriers having a distance of two with next active subcarrier.

The numbering of indexes within the three hundred eighty four active subcarriers starts by one.

More precisely, FIG. 5 represents the values of the set $I_2$.

For example, since index 7 is in $I_2$, this means that the distance between the $7^{th}$ and the $8^{th}$ active subcarriers of indexes with respect to the useful subcarriers indexes 62 and 64 given in FIG. 2 is two.

Figure 6:
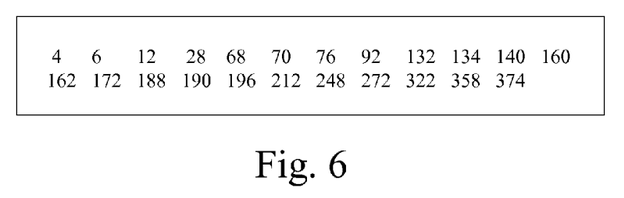
FIG. 6 is a table representing the indexes within the three hundred eighty four active subcarriers of those active subcarriers having a distance of three with next active subcarrier.

FIG. 6 is a table representing the indexes within the three hundred eighty four active subcarriers of those active subcarriers having a distance of three with next active subcarrier.

The numbering of indexes within the three hundred eighty four active subcarriers starts by one.

More precisely, FIG. 6 represents the values of the set $I_3$

For example, since index 4 is in $I_3$, this means that the distance between the $4^{th}$ and the $5^{th}$ active subcarriers of indexes with respect to the useful subcarriers indexes 51 and 54 given in FIG. 2 is three.

Figure 7:
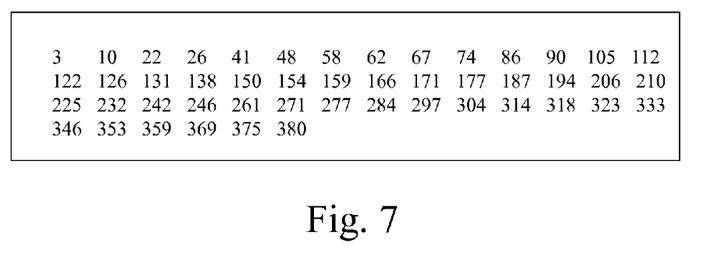
FIG. 7 is a table representing the indexes within the three hundred eighty four active subcarriers of those active subcarriers having a distance of four with next active subcarrier.

FIG. 7 is a table representing the indexes within the three hundred eighty four active subcarriers of those active subcarriers having a distance of four with next active subcarrier.

The numbering of indexes within the 384 active subcarriers starts by one.

More precisely, FIG. 7 represents the values of the set $I_4$

For example, since index 3 is in $I_4$, this means that the distance between the $3^{rd}$ and the $4^{th}$ active subcarriers of indexes with respect to the useful subcarriers indexes 47 and 51 given in FIG. 2 is four.

Figure 8:
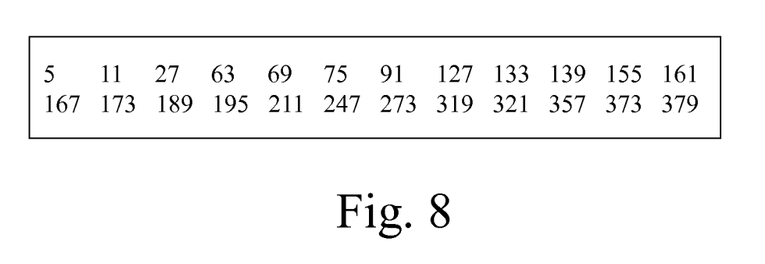
FIG. 8 is a table representing the indexes within the three hundred eighty four active subcarriers of those active subcarriers having a distance of five with next active subcarrier.

FIG. 8 is a table representing the indexes within the three hundred eighty four active subcarriers of those active subcarriers and having a distance of five with next active subcarrier.

The numbering of indexes within the three hundred eighty four active subcarriers starts by one.

More precisely, FIG. 8 represents the values of the set $I_5$

For example, since index 5 is in $I_5$, this means that the distance between the $5^{th}$ and the $6^{th}$ active subcarriers of indexes with respect to the useful subcarriers indexes 47 and 51 given in FIG. 2 is five.

Figure 9:
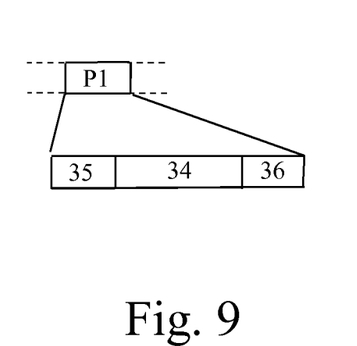
FIG. 9 represents an example of a construction of a symbol P1 and its guard intervals.

FIG. 9 represents an example of a construction of a symbol P1 and its guard intervals.

Prefix 34 and suffix 35 are guard intervals defined at both sides of the useful part of the symbol P1. Instead of cyclic continuation like a classical OFDM (Orthogonal Frequency Division Mutltiplexing) symbol, a frequency shifted version of the symbol is used. Thus, denoting 35 the first guard interval, 34 the main part of the symbol and 36 the last guard interval of the symbol, the last guard interval 36 carries the frequency shifted version of the last five hundred forty two samples of the symbol 34, while the first guard interval 35 conveys the frequency shifted version of the first four hundred eighty two samples of the symbol 34.

It has to be noted here that the present invention is also applicable for any type of guard intervals like when there is a single guard interval, or a simple classical cyclic prefix.

Figure 10:
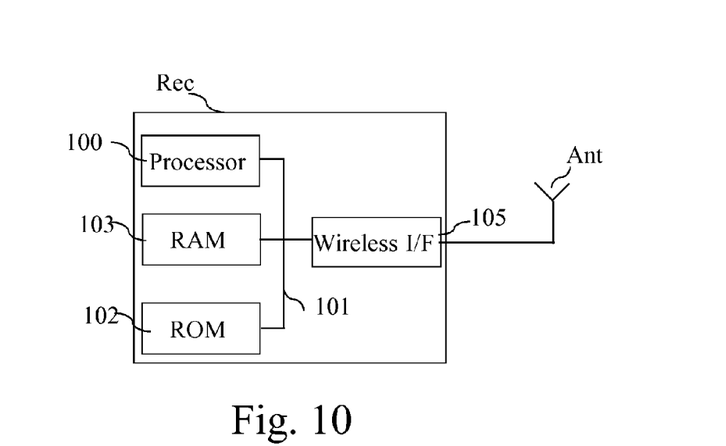
FIG. 10 is a diagram representing the architecture of a receiver in which the present invention is implemented.

FIG. 10 is a diagram representing the architecture of a receiver in which the present invention is implemented.

Figure 15:
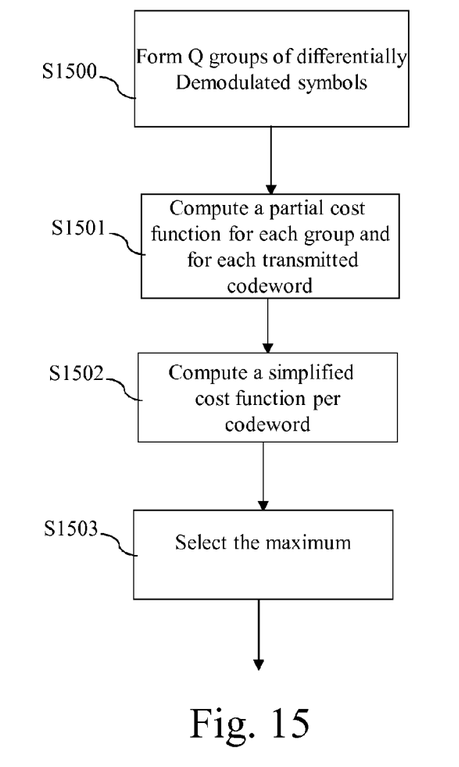
FIG. 15 discloses an example of an algorithm executed by the receiver according to the present invention.

The receiver Rec has, for example, an architecture based on components connected together by a bus 101 and a processor 100 controlled by the program as disclosed in FIG. 15.

It has to be noted here that the receiver Rec may have an architecture based on dedicated integrated circuits.

The bus 101 links the processor 100 to a read only memory ROM 102, a random access memory RAM 103 and a wireless interface 105.

The memory 103 contains registers intended to receive variables and the instructions of the program related to the algorithm as disclosed in FIG. 15.

The processor 100 controls the operation of the wireless interface 105.

The read only memory 102 contains instructions of the program related to the algorithm as disclosed in FIG. 15, which are transferred, when the receiver Rec is activated, to the random access memory 103.

The wireless interface 105 comprises means for receiving radio signals transferred or broadcasted by the source Srct.

The wireless interface 105 is connected to at least one antenna Ant used for receiving transferred or broadcasted signals.

Figure 11:
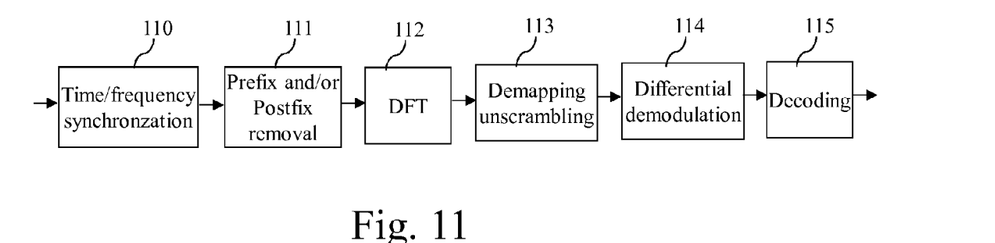
FIG. 11 discloses a block diagram of components of a wireless interface of the receiver.

FIG. 11 discloses a block diagram of components of a wireless interface of the receiver.

The wireless interface 105 of the receiver Rec comprises a time frequency synchronization module 110 which performs synchronization.

It has to be noted here that the synchronization may be affected by a timing offset error as it will be disclosed hereinafter.

The wireless interface 105 of the receiver Rec comprises a prefix and/or postfix removal module 111 which removes the prefix 35 and suffix 36 disclosed in FIG. 9 for the synchronized received symbols.

The wireless interface 105 of the receiver Rec comprises, when the present invention is implemented with OFDM transmission scheme, a DFT module 112 which performs a Discrete Fourier Transform on the received symbols on which the prefix 35 and suffix 36 are removed.

The wireless interface 105 of the receiver Rec comprises a sub-carrier demapping and unscrambling module 113 which demaps the output of the DFT module 112 by removing the guard subcarriers to obtain the useful subcarriers.

The subcarrier demapping and unscrambling module 113 retrieves the M active subcarriers following a given subcarrier mapping pattern as shown in the example of FIG. 2.

Subcarrier demapping is followed by unscrambling.

The wireless interface 105 of the receiver Rec comprises a differential demodulator 114 which demodulates the signals provided by the sub-carrier demapping and unscrambling module 113.

More precisely, the differential demodulator 114 obtains a vector of differentially demodulated symbols by differentially demodulating the differentially modulated received symbols, each differentially demodulated symbol being obtained by combining two consecutive differentially modulated received symbols.

The wireless interface 105 of the receiver Rec comprises a decoding module 115 which decodes the output of the differential demodulator 114.

As it has been already mentioned, the time frequency synchronization module 110 is imperfect and a timing offset of TO samples is introduced.

TO is either positive or negative.

After DFT and subcarrier demapping onto useful subcarriers of index $k_i$, where $k_i$ are not necessarily consecutive or equidistantly distributed as shown in FIG. 2, the signal at the output of the sub-carrier demapping and unscrambling module 113 can be expressed as follows:

$$y_i = h_i x_i \exp\left(-j\underbrace{2\pi TO/N}_{\varphi} \cdot k_i\right) + \eta_i, \, i = 0 \ldots M-1$$

Where $h_i$ is the channel transfer function corresponding to the useful carrier of index $k_i$ and $\eta_i$ is the noise experienced onto that subcarrier, of variance $\sigma^2$.

This relationship is strictly accurate in an OFDM system with a cyclic prefix and/or suffix. In the case where the prefix and/or suffix are not cyclic, this equation can be considered as valid, considering that the noise part also includes the interference due to the fact that prefix and/or suffix are not cyclic.

The signal at the output of the differential demodulation module 114 can be expressed as follows:

$$r_i =$$
$$y_i y_{i-1}^* = \underbrace{h_i h_{i-1}^* x_i x_{i-1}^* \exp(-j\varphi(k_i - k_{i-1}))}_{\alpha_i} + n_i = h_i h_{i-1}^* d_i \exp(-j\alpha_i \varphi) + n_i,$$
$$i = 1 \ldots M-1$$

Where $n_i$ is an equivalent noise $n_i = \eta_{i-1}^* \eta_i + h_i x_i \eta_{i-1}^* + h_{i-1}^* x_{i-1}^* \eta_i$ of variance $\mu_i^2 = \sigma^4 + \sigma^2(\rho_{i-1}^2 + \rho_i^2)$, $\rho_i = |h_i|$. In the equation here-above the initial element $d_0 = 1$ of each codeword d is ignored. We consider, as in the general case, that the codewords d before differential modulation and the differentially demodulated vectors r after differential demodulation have M−1 useful elements numbered from 1 to M−1. If there was a need of also considering the element $d_0 = 1$ and thus have codewords d having M elements, a dummy value $r_0$ must be inserted. The codewords d before differential modulation and the differentially demodulated vectors r after differential demodulation must have the same number of elements, each element $r_i$ being the received version of the element $d_i$ having within the codeword d the same rank as its received version $r_i$ within the vector of differentially demodulated vector r.

A timing offset introduces a phase error ramp or a phase error that can be approximated by a phase ramp onto the demodulated signal. The phase rotation suffered by any demodulated symbol depends on the timing offset TO and on the distance $\alpha_i$ between the subcarriers carrying the differentially modulated symbols allowing the estimation of the current differentially demodulated symbol.

According to the invention, the decoder module 115 is arranged for alleviating the performance degradation engendered by the phase error.

A modified log likelihood ratio criterion is applied. This means to maximize the global cost function $$\Lambda = \max_{\varphi,d}(\log(P(r \mid \varphi, d))).$$

It has to be noted here that a cost function may be also named a figure of merit or a confidence level or a utility function or a reliability function.

For each codeword $d^n$ the decoding module 115 finds an estimate phase $\hat{\varphi}^n$ which achieves $$\Lambda_n = \max_{\varphi}(\log(P(r \mid \varphi, d^n))).$$

In the particular case of the DVB standard and P1 symbol, $d^n$ is the n-th codeword out of a set of 128 codewords used to encode the p=7 bits of information S.

Decoding is performed by finding $\hat{d} = d^{n_{max}}$ where $n_{max}$ is the index ensuring $$\Lambda = \Lambda_{n_{max}} = \max_n(\Lambda_n) = \max_n(\log(P(r \mid \hat{\varphi}^n, d^n))).$$

Maximizing the cost function per codeword $\Lambda_n$ is equivalent to maximizing $$\Lambda'_n = \sum_{i=1}^{M-1} \frac{\rho_i \rho_{i-1}}{\mu_i^2} \operatorname{Re}(r_i d_i^{n*} \exp(-j\alpha_i \varphi))$$

As the telecommunication network employs differential modulation where no channel estimation is performed, the term $$\frac{\rho_i \rho_{i-1}}{\mu_i^2}$$

is ignored in the maximization. Then:

$$\Lambda''_n = \sum_{i=1}^{M-1} \operatorname{Re}(r_i d_i^{n*} \exp(-j\alpha_i \varphi))$$

According to a particular mode of realization, when the elements $\alpha_i$ of $\alpha$ take Q different values as in the example of FIG. 3, the present invention forms Q groups of differentially demodulated symbols and processes each group separately.

The above mentioned equation can be rewritten as a sum of partial cost functions per codeword, each partial cost function corresponding to the modulation symbols associated to a given subcarrier distance:

$$\Lambda''_n = \sum_{k=1}^{Q} \left( \sum_{i \in I_k} \operatorname{Re}(r_i d_i^{n*} \exp(-jA_k\varphi)) \right)$$

$$\Lambda''_n = \sum_{k=1}^{Q} \left( \operatorname{Re}\left( \exp(-jA_k\varphi) \sum_{i \in I_k} r_i d_i^{n*} \right) \right) = \sum_{k=1}^{Q} (\Lambda''_{n,k}(\varphi))$$

For example, the partial cost function $$\Lambda''_{n,k=3}(\varphi) = \operatorname{Re}\left( \exp(-jA_{k=3}\varphi) \sum_{i \in I_3} r_i d_i^{n*} \right)$$

corresponds to those modulation symbols $d_i^n$, $i \in I_3$ composing the n-th codeword $d^n$ and to the corresponding received differentially demodulated symbols $r_i$ that can be retrieved from received differentially modulated symbols $y_{i-1}$, $y_i$ mapped onto the i-th and i+1th active subcarriers out of three hundred eighty four active subcarriers, of indexes $k_{i-1}$ and $k_i$ distanced by $A_3 = k_i - k_{i-1} = 3$ within the set of eight hundred fifty three useful subcarriers.

A separate maximization of each partial cost function is performed. We can simplify the above mentioned equation and thus compute a simplified cost function per codeword as follows:

$$\Lambda''_n = \sum_{k=1}^{Q} (\Lambda''_{n,k}(\varphi_k))$$

We have thus to find $$\varphi_k = \operatorname*{argmax}_{\varphi} \Lambda''_{n,k} = \operatorname*{argmax}_{\varphi}\left( \operatorname{Re}\left( \exp(-jA_k\varphi) \sum_{i \in I_k} r_i d_i^{n*} \right) \right)$$

$$\varphi_k = \frac{1}{A_k} \arctan \frac{\operatorname{Im}\left( \sum_{i \in I_k} r_i d_i^{n*} \right)}{\operatorname{Re}\left( \sum_{i \in I_k} r_i d_i^{n*} \right)}$$

With this value, the computation of the partial cost function $\Lambda''_{n,k}$ reduces to:

$$\Lambda''_{n,k} = \left| \sum_{i \in I_k} r_i d_i^{n*} \right|.$$

Figure 12:
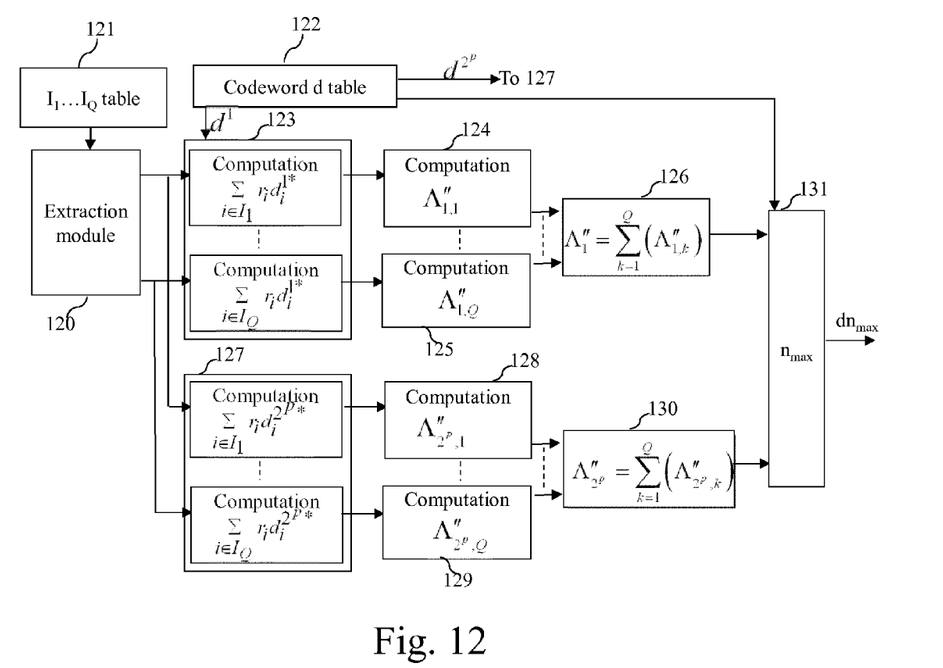
FIG. 12 discloses a block diagram of components of the decoder module of the wireless interface of the receiver.

FIG. 12 discloses a block diagram of components of the decoder module of the wireless interface of the receiver.

The decoder 115 jointly decodes the transmitted symbols d and corrects the phase error.

The decoder 115 comprises an extraction module 120 which forms Q groups of differentially demodulated symbols using a table 121 which enables the extraction module 120 to identify the differentially demodulated symbols obtained from received symbols transferred onto active subcarriers distanced by a given distance.

The extraction module 120 identifies Q groups of differentially demodulated symbols $r_i$, each k-th group having $q_k$ differentially demodulated symbols, each such differentially demodulated symbol $r_i$ being obtained by combining received symbols $y_i$, $y_{i-1}$ transferred onto subcarriers identified by indexes $k_i$, $k_{i-1}$ and distanced by a fixed distance $A_k = k_i - k_{i-1}$ in the space of useful subcarriers.

The set of indexes i of the identified differentially demodulated symbols $r_i$ in the k-th group is denoted by $I_k$ The decoder 115 comprises $2^p$ preliminary sum computation modules. Only two preliminary sum computation modules 123 and 127 are shown in FIG. 12 for the sake of clarity.

The preliminary sum computation module 123 calculates the sums $$\sum_{i \in I_1} r_i d_i^{1*}, \sum_{i \in I_2} r_i d_i^{1*}, \sum_{i \in I_3} r_i d_i^{1*}, \sum_{i \in I_4} r_i d_i^{1*} \text{ and } \sum_{i \in I_5} r_i d_i^{1*}$$

using the codeword $d^1$ provided by a code word table 122.

The preliminary sum computation module 127 calculates the sums $$\sum_{i \in I_1} r_i d_i^{2^{p*}}, \sum_{i \in I_2} r_i d_i^{2^{p*}}, \sum_{i \in I_3} r_i d_i^{2^{p*}}, \sum_{i \in I_4} r_i d_i^{2^{p*}} \text{ and } \sum_{i \in I_5} r_i d_i^{2^{p*}}$$

using the codeword $d^{2^p}$ provided by the code word table 122.

Each preliminary sum computation module 123, 127 provides Q respective sums to Q partial cost function computation modules.

Only four partial cost function computation modules are shown in FIG. 12 for the sake of clarity.

The preliminary sum computation module 123 provides the first sum $$\sum_{i \in I_1} r_i d_i^{1*}$$

to the partial cost function computation module 124 which calculates the partial cost function $$\Lambda''_{1,1} = \left| \sum_{i \in I_1} r_i d_i^{1*} \right|.$$

The preliminary sum computation module 123 provides the Qth sum $$\sum_{i \in I_Q} r_i d_i^{1*}$$

to the partial cost function computation module 125 which calculates the partial cost function $$\Lambda''_{1,Q} = \left| \sum_{i \in I_Q} r_i d_i^{1*} \right|.$$

The preliminary sum computation module 127 provides the first sum $$\sum_{i \in I_1} r_i d_i^{2^{p*}}$$

to the partial cost function computation module 128 which calculates the partial cost function $$\Lambda''_{2^p,1} = \left| \sum_{i \in I_1} r_i d_i^{2^{p*}} \right|.$$

The preliminary sum computation module 127 provides the Qth sum $$\sum_{i \in I_Q} r_i d_i^{2^{p*}}$$

to the partial cost function computation module 129 which calculates the partial cost function $$\Lambda''_{2^p,Q} = \left| \sum_{i \in I_Q} r_i d_i^{2^{p*}} \right|.$$

For each codeword, for each k-th group of the Q groups of differentially demodulated symbols already identified, a partial cost function is then calculated. This partial cost function implicitly contains sub-optimal phase error compensation, since the estimated common phase shift $A_k \phi_k$ is locally compensated for this group.

The partial cost function modules 124 and 125 provide the calculated partial cost functions to a simplified cost function per codeword calculation module 126 which calculates $$\Lambda''_1 = \sum_{k=1}^{Q} (\Lambda''_{1,k}).$$

The partial cost function modules 128 and 129 provide the calculated partial cost functions to a simplified cost function per codeword calculation module 130 which calculates $$\Lambda''_{2^p} = \sum_{k=1}^{Q} (\Lambda''_{2^p,k}).$$

Each simplified cost function per codeword is fed into a maximization module 131 which decides that codeword $d^{n_{max}}$ was transmitted by choosing:

$$n_{max} = \underset{n}{\mathrm{argmax}}(\Lambda_n'')$$

Figure 13:
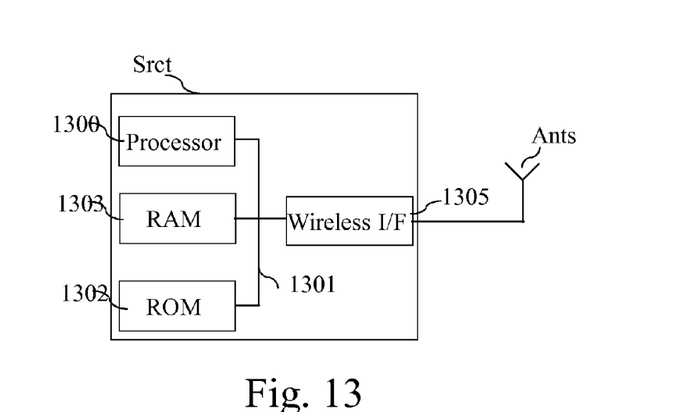
FIG. 13 is a diagram representing the architecture of a source.

FIG. 13 is a diagram representing the architecture of a source.

The source Srct has, for example, an architecture based on components connected together by a bus 1301 and a processor 1300 controlled by programs.

It has to be noted here that the source Srct may have an architecture based on dedicated integrated circuits.

The bus 1301 links the processor 1300 to a read only memory ROM 1302, a random access memory RAM 1303 and a wireless interface 1305.

The memory 1303 contains registers intended to receive variables and the instructions of the programs.

The processor 1300 controls the operation of the wireless interface 1305.

The read only memory 1302 contains instructions of the programs which are transferred, when the source Srct is activated, to the random access memory 1303.

The wireless interface 1305 comprises means for transferring symbols according to the invention.

The wireless interface 1305 is connected to an antenna Ants used for broadcasting signals according to the present invention.

The wireless interface 1305 comprises components as disclosed in FIG. 14.

FIG. 14 discloses a block diagram of components of a wireless interface of the source.

The wireless interface of the source Srct comprises an error correcting coding module 140 which encodes a binary sequence S using an error correction code.

The output b of the error correcting module 140 is transposed to a binary +1/−1 sequence d and provided to a differential modulation module 141 which modulates it. The modulation may be DBPSK, DQPSK, DAPSK, DPSK or any other differential modulation. The resulting M-length sequence x can be optionally scrambled by the scrambling module 142. This scrambled sequence $x_{SCR}$ is mapped onto the M active subcarriers by the zero insertion and mapping module 143 following a given subcarrier mapping pattern provided by a mapping pattern module 144 which is for example as the one disclosed in FIG. 2.

After N-point Inverse Discrete Fourier Transform executed by a IDFT module 145, a prefix and/or suffix can be inserted prior to transmission by a prefix/posfix insertion module. In the case of TDM sequential transmission, the IDFT module is missing and the mapping is understood as being realized in the time domain (time positions instead of subcarriers).

FIG. 15 discloses an example of an algorithm executed by the receiver according to the present invention.

At step S1500, the receiver Rec forms Q groups of differentially demodulated symbols using a table 121 which enables the extraction module 120 to identify the differentially demodulated symbols obtained from received symbols transferred onto subcarriers distanced by a given distance.

It has to be noted here that when the modulated received symbols are transferred onto resources equally spaced, the step S1500 is not executed or a single group of differentially demodulated symbols is formed.

The table 121 comprises the tables shown in FIGS. 4 to 8.

The extraction module 120 identifies Q groups of differentially demodulated symbols $r_i$, each k-th group having $q_k$ differentially demodulated symbols, each such differentially demodulated symbol $r_i$ being obtained by combining received symbols $y_i$, $y_{i-1}$ transferred onto positions $k_i$, $k_{i-1}$ distanced by a fixed distance $A_k = k_i - k_{i-1}$ in the space of useful subcarriers. The set of indexes i of the identified differentially demodulated symbols $r_i$ in the k-th group is denoted by $I_k$.

At next step S1501, the receiver calculates for each k-th group of the Q groups of differentially demodulated symbols already identified and for each n-th codeword $d^n$, a partial cost function $$\Lambda_{n,k}'' = \left| \sum_{i \in I_k} r_i d_i^{n*} \right|.$$

These partial cost functions implicitly contain sub-optimal phase error compensation, since the estimated common phase shift $A_k \phi_k$ is locally compensated for the group of symbols involved in the computation of each partial cost function.

At next step S1502, the receiver Rec computes a simplified cost function per codeword $$\Lambda_n'' = \sum_{k=1}^{Q} (\Lambda_{n,k}'').$$

At next step S1503, the receiver Rec decides that codeword $d^{n_{max}}$ was transmitted by choosing $$n_{max} = \underset{n}{\mathrm{argmax}}(\Lambda_n'').$$

Figure 16:
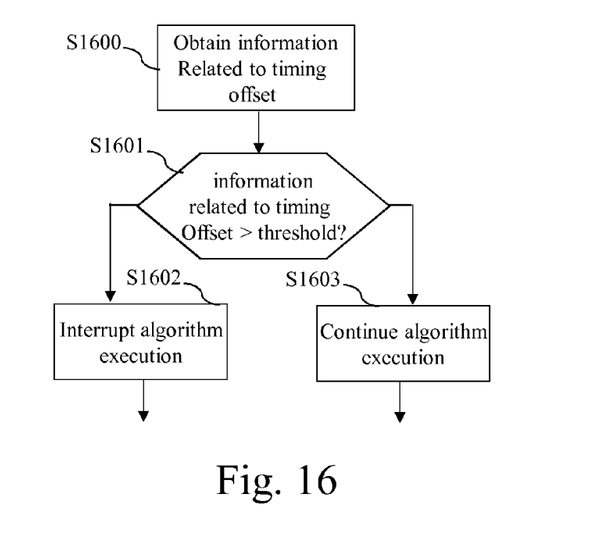
FIG. 16 discloses a particular mode of the realization of the algorithm executed by the receiver according to the present invention.

FIG. 16 discloses a particular mode of realization of the algorithm executed by the receiver according to the present invention.

FIG. 16 discloses the particular case of an OFDM system where a timing offset during the time synchronization case causes a phase ramp error or a phase error that can be approximated by a phase ramp on the received differentially modulated symbols. In the case of a TDM transmission, "timing offset during the time synchronization" is replaced by "frequency synchronization error".

According to the particular mode of realization of the present algorithm, a supplementary condition of ignoring the phase error due to the timing offset and performing classical decoding is performed if the estimated timing offset is inferior to a certain threshold, for example if no timing offset is present or if it is small enough.

If a priori information exist on the existence/importance of the timing offset, the algorithm of FIG. 15 may be applied only when the timing offset is known to be important enough. When no prior information exists, the timing offset can be estimated either in the early phases of the detection, e.g. relying on some or all of the possible phase estimates given for some or all of the possible codewords, or in the late stages of the detection e.g. an estimate corresponding only to the detected codeword $d^{n_{max}}$.

At step S1600, the receiver Rec obtains information related to a timing offset that may occur or occurs during the synchronization of the differentially modulated received symbols as disclosed previously.

At next step S1601, the receiver Rec checks if information related to the timing offset is upper than a predetermined value or threshold.

If information related to the timing offset is upper than the predetermined value, the receiver moves to step S1603 and the execution of the algorithm as disclosed in FIG. 15 continues to be executed.

If information related to the timing offset is not upper than the predetermined value, the receiver moves to step S1602 and the execution of the algorithm as disclosed in FIG. 15 is interrupted.

For example a classical decoding is performed.

As already stated, the present invention is also applicable for TDM transmission scheme.

In that case, differentially encoded sequence transmitted on time-domain positions are not necessarily consecutive. Active subcarriers disclosed in the above given example are replaced by time-domain occupied positions.

In a similar way as the one described for OFDM transmission scheme, received sequence is affected by a phase ramp error in the time domain due for example to a Doppler shift, or to a frequency synchronization error.

The timing offset error causing a frequency-domain phase ramp for OFDM transmission scheme is replaced by frequency error causing a time domain phase ramp in TDM transmission scheme.

Furthermore, in the transmitter/receiver structure, the IDFT/DFT are missing for TDM transmission scheme.

Naturally, many modifications can be made to the embodiments of the invention described above without departing from the scope of the present invention.

The invention claimed is:

1. A method for decoding differentially modulated received symbols at a receiver, comprising:
   receiving the differentially modulated symbols on resources that are not equally spaced, the differentially modulated received symbols correspond to a transmission of a differentially modulated version of a codeword out of a set of possible codewords, each codeword is a vector composed of a predetermined number of elements, the received symbols is received on resources of a channel between a transmitter and the receiver; and
   for each possible codeword:
   grouping the differentially demodulated received symbols into groups of differentially demodulated symbols, each group of differentially demodulated symbols comprising plural symbols obtained by combining two consecutive differentially modulated received symbols transferred onto resources spaced by a predetermined number of resources, the predetermined number of resources being different for each group;
   obtaining a vector of differentially demodulated symbols by differentially demodulating the differentially modulated received symbols, each differentially demodulated symbol being obtained by combining two consecutive differentially modulated received symbols;
   calculating for each group of differentially demodulated symbols the product of each differentially demodulated symbol obtained by combining two consecutive modulated received symbols transferred onto resources equally spaced by the conjugate of the element of the codeword having the same rank within the codeword as the differentially demodulated received symbol within the vector of differentially demodulated symbols;
   calculating, for each group of differentially demodulated symbols and for each possible symbol, a module of the sum of the products;
   summing, for each group of differentially demodulated symbols and for each possible symbol, modules of the sums calculated for all the groups of differentially demodulated symbols;
   decoding the vector of differentially demodulated symbols by selecting the codeword for which the module of the sum of the products is the maximum among the calculated modules of sums of the products,
   wherein the received symbols are frequency elements of Orthogonal Frequency Division Multiplexing symbols and the differentially modulated symbols are transferred onto sub-carriers.

2. The method according to claim 1, wherein the received symbols are time division multiplexing symbols and the differentially modulated symbols are transferred onto time slots.

3. The method according to claim 1, further comprising:
   obtaining information related to a phase ramp error that may occur or occurs onto the differentially modulated received symbols;
   checking if information related to the phase ramp error is upper than a predetermined value;
   interrupting the products and modules of the sums calculations if information related to the phase ramp error is not upper than the predetermined value.

4. A device for decoding differentially modulated received symbols, comprising:
   a processor configured to
   receive the differentially modulated symbols on resources that are not equally spaced, the differentially modulated received symbols correspond to a transmission of a differentially modulated version of a codeword out of a set of possible codewords, each codeword is a vector composed of a predetermined number of elements, the received symbols is received on resources of a channel between a transmitter and the receiver; and
   for each possible codeword:
   group the differentially demodulated received symbols into groups of differentially demodulated symbols, each group of differentially demodulated symbols comprising plural symbols obtained by combining two consecutive differentially modulated received symbols transferred onto resources spaced by a predetermined number of resources, the predetermined number of resources being different for each group;
   obtain a vector of differentially demodulated symbols by differentially demodulating the differentially modulated received symbols, each differentially demodulated symbol being obtained by combining two consecutive differentially modulated received symbols;
   calculate for each group of differentially demodulated symbols the product of each differentially demodulated symbol obtained by combining two consecutive modulated received symbols transferred onto resources equally spaced by the conjugate of the element of the codeword having the same rank within the codeword as the differentially demodulated received symbol within the vector of differentially demodulated symbols;
   calculate, for each group of differentially demodulated symbols and for each possible symbol, a module of the sum of the products;
   sum, for each group of differentially demodulated symbols and for each possible symbol, modules of the sums calculated for all the groups of differentially demodulated symbols;
   decode the vector of differentially demodulated symbols by selecting the codeword for which the module of the sum of the products is the maximum among the calculated modules of sums of the products,
wherein the received symbols are frequency elements of Orthogonal Frequency Division Multiplexing symbols and the differentially modulated symbols are transferred onto sub-carriers.

5. A non-transitory computer readable medium including a computer program which can be directly loadable into a programmable device, comprising instructions or portions of code for implementing the method according to claim 1 when the computer program is executed on a programmable device.

\* \* \* \* \*